| United States Patent [19] | [11] Patent Number: 4,944,812 |
|---|---|
| Lindert et al. | [45] Date of Patent: Jul. 31, 1990 |

[54] TANNIN MANNICH ADDUCTS FOR IMPROVING CORROSION RESISTANCE OF METALS

[75] Inventors: Andreas Lindert, Troy; Stephen M. Wolpert, Detroit, both of Mich.

[73] Assignee: Henkel Corporation, Ambler, Pa.

[21] Appl. No.: 272,172

[22] Filed: Nov. 16, 1988

[51] Int. Cl.$^5$ .............................................. C23C 32/82
[52] U.S. Cl. .................................. 148/251; 148/274; 148/257; 148/247; 528/148; 528/162; 106/14.15
[58] Field of Search .............. 148/247, 251, 274, 257; 528/148, 162; 106/14.15

[56] References Cited

U.S. PATENT DOCUMENTS

| 2,098,869 | 11/1937 | Harmon | 528/162 |
|---|---|---|---|
| 2,809,088 | 6/1943 | Bauer | 528/162 |
| 3,975,214 | 8/1976 | Kulick et al. | 148/6.15 |
| 4,174,980 | 11/1979 | Howell, Jr. et al. | 148/6.14 |
| 4,474,477 | 5/1984 | Deibig | 148/251 |
| 4,819,174 | 3/1989 | Kimura | 148/251 |

*Primary Examiner*—Sam Silverberg
*Attorney, Agent, or Firm*—Ernest G. Szoke; Wayne C. Jaeschke; Michael P. Brennan

[57] ABSTRACT

A vegetable tannin is condensed with formaldehyde and an amine to provide an acid soluble product which is useful in a metal treatment solution to enhance corrosion resistance and paint adhesion characteristics of a metal surface.

21 Claims, No Drawings

TANNIN MANNICH ADDUCTS FOR IMPROVING CORROSION RESISTANCE OF METALS

BACKGROUND OF THE INVENTION

The present invention relates to the art of metal surface treatment. More specifically, the present invention relates to treatment of metal surfaces with a solution of an acid soluble derivative of vegetable tannin to improve the corrosion resistance of the metal.

The need for improvements and protective coatings for metal surfaces to improve the corrosion resistance and paint adhesion characteristics of the metal is well known. Traditionally, metal surfaces are treated with chemicals which form a metal phosphate and/or metal oxide conversion coating on the metal surface to improve the corrosion resistance and paint adhesion thereof. Also traditionally, the conversion coated metal surfaces have been rinsed or post-treated with a solution containing a hexavalent chromium compound for even greater corrosion resistance and paint adhesion.

In recent years, there has been much research and development directed to discovering effective alternatives to the use of hexavalent chromium compounds. The use of tannins in compositions for treatment of bare or corroded metallic surfaces has been disclosed, for example, in U.S. Pat. Nos. 3,975,214, Aug. 17, 1976 to Kulick, et al. and 4,174,980, Nov. 20, 1979 to Howell, Jr., et al. and in references cited therein.

In accordance with the present invention, a novel product which can be made water soluble by partial or complete neutralization with acid is provided by reacting a vegetable tannin such as Quebracho with an aldehyde or formaldehyde and a primary or secondary amine. The product is soluble in water when neutralized with acid or base and is useful for the treatment of aluminum, galvanized metal and other metals for improving their corrosion resistance. Further understanding of this invention will be had from the following disclosure wherein all parts and percentages are by weight unless otherwise indicated.

SUMMARY OF THE INVENTION

In accordance with the present invention, a vegetable tannin is condensed with an aldehyde and ammonia or a primary or secondary amine to provide a water soluble product, the solution of which is useful as a metal treatment solution. In accordance with the method of the present invention, a metal surface is contacted with the aforementioned solution to enhance the corrosion resistance and paint adhesion characteristics of the metal surface.

DETAILED DESCRIPTION OF THE INVENTION

The present invention is directed towards improving the corrosion and humidity resistance of metallic surfaces, preferably conversion coated metallic surfaces. A broad range of metallic surfaces can be effectively treated in accordance with the method of this invention, such as, for example, steel including cold rolled, polished, ground, pickled, and hot rolled steel, galvanized steel, aluminum, and metallic surfaces containing zinc, iron or aluminum. The present invention is useful with metals having previously conversion coated surfaces or untreated metallic surfaces.

Conversion coatings are well known and have been described, for example, in *Metal Handbook Volume II,* 8th edition, pp. 529–547 of The American Society for Metals, and in *Metal Finishing Guidebook and Directory,* pp. 590–603 (1972), the contents of both of which are specifically incorporated herein by reference. In a typical metal treatment operation employing a composition and process of this invention, the metal to be treated is initially cleaned by a chemical or physical process and then water rinsed to remove grease and dirt from the surface. The metal surface is then preferably brought into contact with a conversion coating solution to form a conversion coating thereon. Examples of conversion coating solutions include solutions comprising iron phosphate, manganese phosphate, zinc phosphate, zinc phosphate modified with calcium, nickel or magnesium ions. Then the metal surface is water rinsed.

In accordance with the present invention, a metal surface, preferably a metal surface which has been conversion coated, is brought into contact with a metal treatment solution of the present invention. The treatment solution comprises an effective amount of a metal treatment composition.

The metal treatment composition is a reaction product obtained by condensing vegetable tannin with an aldehyde, preferably formaldehyde, and ammonia or a primary or secondary amine to provide a product which is soluble in water when reacted in part or in whole with acids such as phosphoric acid, nitric acid, hydrofluoric acid, hydroboric acid and the like. The soluble product is then employed in the metal treatment solution to treat metals to improve the corrosion resistance thereof. The condensation reaction of vegetable tannin, ammonia or a primary or secondary amine and an aldehyde will be recognized as a "Mannich" type reaction. It is believed the hydrogen atoms ortho and para to phenolic hydroxyls in the vegetable tannins exhibit pronounced reactivity to react in a condensation reaction with the ammonia or primary or secondary amine and formaldehyde in a Mannich type reaction. Generally, one mole of aldehyde and one mole of amine (1 mole of nitrogen) is combined with from 200 to about 450 grams (⅔ to 3/2 equivalents) of tannin in the case of Quebracho.

Suitable vegetable tannins include the crude, ordinary or hot-water soluble, condensed, vegetable tannins. Quebracho or Wattles are preferred condensed vegetable tannins. Other vegetable tannins include mangrove, spruce, hemlock, gabien, catechu, uranday, tea, larch and the like. It will be understood that these vegetable tannins are not pure chemical components with known structures but rather contain numerous components including phenolic moieties such as catechol, pyrogallol and so forth condensed into a complicated polymeric structure. These phenolic moieties are collectively referred to herein as the polyphenol in the tannin.

Suitable amines include methylethylamine, dimethylamine, diethylamine, diethanolamine, dipropylamine, di-n-butylamine, diisoamylamine, dibenzylamine, methyldiethylethylenediamine, methylaniline, piperidine, 1,2,3,4,-tetrahydroisoquinoline, 6-methoxy-1,2,3,4,-tetrahydroisoquinoline, morpholine, piperazine, ω-methylaminopropiophenone, β-acetylethylbenzylamine; benzyl-(2-cyclohexanonylmethyl)-amine, 3,4-methylenedioxybenzyl-(2-cyclohexanonylmethyl)-amine, N-methylglucamine, glucosamine, and t-butylamine.

Although other aldehydes can be employed in the reaction, formaldehyde is preferred and is preferably used in the form of a 20–40% aqueous solution or as paraformaldehyde.

One skilled in the art will be familiar with the Mannich reaction and the conditions for carrying out the reaction. The time required for the reaction depends upon the nature of the exact reactants employed and reaction conditions such as temperature and concentration of reactants. Generally speaking, 1.00 molecular equivalent of the polyphenol, 1.00 to 1.10 molecular equivalents of the amine and 1.0 to 2.0 molecular equivalents of formaldehyde are employed in the reaction. Upon completion of the reaction, the reaction product is recovered and neutralized with acid to a pH of from about 1 to about 8 to provide a concentrated treatment solution of the present invention. Typically the concentrate contains from 25 grams per liter to 400 grams per liter solids. For transportation, the reaction product can be stored in a high concentration form as stated above. The treatment solution of the present invention comprises an effective amount of the above reaction product. The treatment solution can have any pH at which effective results are obtained. Typically pH's broadly range from about pH 0.5 to about pH 13. The treatment solution can be obtained from the concentrate by dilution with water to provide a working treatment solution having a dilute concentration of from about 0.01 grams per liter to about 50 grams per liter. Preferably a concentration of from about 0.1 grams per liter to about 20 grams per liter is employed in the working solution. The concentration can, of course, vary and is dependent upon the time of treatment, temperature of the treatment and the metal treated.

Application of the treatment solution of the present invention to a metal surface can be carried out by any conventional method. The metal surface can be a previously conversion coated metal surface or can alternatively be an untreated metal surface. The treatment solution can be applied by spray coating, roller coating, or dipping. The temperature of the solution can vary over a wide range but is preferably from about 65° F. to about 150° F. when applied to the metal surface. After application of the treatment solution to the metal surface, the surface can optionally be rinsed, although good results can be obtained without rinsing after treatment. For some end uses, rinsing is preferred. After the treatment step, the treated metal surface is dried by, for example, circulating air or oven drying. Room temperature drying can be employed but it is preferable to use elevated temperatures to decrease the drying time required. After drying, the treated metal surface is ready for subsequent painting or the like. Standard paint or other coating application techniques such as brush painting, spray painting, electrostatic coating, dipping, roller coating as well as electro-coating can be employed. As the result of the treatment step of the present invention, the surface will have improved paint adhesion and corrosion resistance characteristics.

Of course, the treatment solution of the present invention can also comprise ingredients in addition to the treatment compound. For example, the treatment solution may optionally comprise, in addition to the treatment compound, from about 0.001% to about 1.0% of a metal ion. Metal ions useful for metal treatment in combination with polyphenols of this invention include first row transition metals generally, Group IV-B-metals generally, iron, nickel, cobalt, vanadium, chromium, titanium, zirconium, hafnium, scandium, ytterium, lanthanum and their respective Lanthanoid and Actinoid metals as well as molybdenum and tungsten. In addition, tin and silicon compounds in combination with the polyphenols of the present invention can be used to improve both the effectiveness or performance of the treatment solution in use and to also reduce the time of application of treatment solution to the metal surface to as short a time as about 2 to 5 seconds as might be required on a coil coating line. Further understanding of the present invention can be had from the following illustrative examples:

EXAMPLE 1

Reaction Product

An aqueous composition was made of the components in Table 1 in the following manner. Quebracho, as a spray dried powder, was slurried with water in an open beaker at ambient temperature (near 25° C.) while stirring. Diethanolamine, a secondary amine, was added and the tannin dissolved to a dark brown, opaque solution. Formaldehyde, as a 37% aqueous solution, was dripped into the solution over the course of about one hour. Drops of formaldehyde caused a local color change to a whitish-purple. The ratio of equivalents of phenolic tannin to formaldehyde to amine was 1:1:1. No acid catalyst was necessary for this type of Mannich reaction.

TABLE 1

| Component | Grams | E.W. | Eqv. | g.N.V. |
|---|---|---|---|---|
| D.I. Water | 3,028 | — | — | |
| Quebracho Tannin | 600 | 300* | 2.0 | 600 |
| Diethanolamine | 210 | 105 | 2.0 | 210 |
| 37% Formaldehyde | 162 | 81 | 2.0 | 60 |
| Total: | 4,000 | | | 870 |

*estimated
"E.W." = equivalent weight in grams; "Eqv." = number of equivalents of aldehyde or amine; "g" = grams; "N.V." = non-volatiles after reaction or as an active component.

A reaction product was obtained having a 21.75 wt % suspension with pH near 9. The product was soluble in acids such as nitric, orthophosphoric, hydrofluoric, hydrochloric, oxalic, and the like. Solubilization occurred at pH near 4 and below. The criteria for judging solubilization were a visual appearance change and the lack of any significant quantity of precipitate after centrifuging. The product was diluted to 10 g/L (grams per liter) and neutralized with HF to pH 4.0 to provide a treatment solution for architectural aluminum. In order to test this product, architectural aluminum panels were first conversion coated with a chrome-free formulation, Bonderite ® 787 (commercially available from the Parker Chemical Co.) which had been neutralized with NH$_4$OH to pH between 4 and 5 and was sprayed onto each panel for 5 seconds at 140° F. The resulting conversion coated aluminum panels were then tested with the above chrome-free post-treatment solution, or a conventional chrome post-treatment solution, or with a deionized water control.

These panels were then painted with three different paints, scribed and tested by salt spray (ASTM-B-117) in a conventional manner. The test results demonstrated that for all three paints the above treatment solution provided superior results than the DI-water control and was slightly superior to the chrome control.

EXAMPLE 2

HF Neutralization

The reaction of Example 1 was repeated at 26.3% final, N.V. solids to provide an Example 2 product which was tested as follows. Samples of the Example 2 product were neutralized with various acids, diluted to from about 4 to 8 g/L to provide treatment solutions and tested for effectiveness as passivating treatments for galvanized steel. The criteria for passivation is the well-known spot test using 3% CuSO$_4$ solution. Coupons, cut from temper-rolled, hot dipped galvanized steel were cleaned until water-break-free, rinsed, and allowed to dry. Each coupon was partially immersed for about ten seconds in a beaker of the treatment solution. One drop of blue test solution was placed on the treated part of the coupon, and another drop of blue test solution was placed on the untreated part of the coupon as an internal control. As a second control, similarly cleaned panels known to have been passivated using chrome were also used. The extent of passivation was estimated by comparing the extent of blackness after the same time (about five seconds) for the drops on the three substrates. Blackness appears because the panel is actively reducing blue copper ions to copper metal which deposits as a black precipitate indicating the substrate is not passive.

A treatment solution of the Example 2 product neutralized with HF to a pH near 2.8 at about 5 g/L, 125° F., was found to provide significant passivation as judged by the spot test. The solution provided more passivation than the untreated control and almost as much passivation as the chrome control. The treatment solution was used with only a two second immersion time (instead of a 10 second immersion time) at 85° F. The extent of passivation was much less but still noticeable. The Example 1 product was used at a concentration of 1 g/L and with a 10 second immersion at 140° F. The sample was less passivated than when the Example 1 product was used at a concentration of between 4 g/L and 8 g/L.

When 0.2 M HF solution was titrated into a 5% NV suspension of the Example 2 product, the suspension completely dissolved at pH=4.1. The quantities required corresponded to about 1.6 moles HF per mole diethanolamine. This solution further diluted to 8 g/L provided good passivity (judged by spot test) for galvanized steel, almost as good as chrome control.

EXAMPLE 3

Nitric Acid Neutralization

When 0.2 M HNO$_3$ was titrated into a 5% NV suspension of the Example 2 product, the suspension dissolved completely at pH=4.5 and required about 1.2 moles nitric acid per mole amine. Diluted to about 8 g/L, the solution provided good passivity (almost as good as a chrome treated control) on temper rolled, hot dipped galvanized steel ("TRG") as judged by the CuSO spot test.

Passivation was also demonstrated by another procedure: the Dish Test. Approximately 2 inch square coupons were cut from TRG. Coupons were cleaned, rinsed, dried and treated by immersion into test solutions and allowed to dry. The coupons were placed in a Petrie dish, and one edge of the coupon was supported on a glass rod. Deionized water was added to the dish so as to cover most of the coupon but leaving a strip of about one centimeter uncovered and exposed to air. The Petrie dishes were covered loosely. After 16 hours (overnight) the coupons were observed and rated for quantity of white corrosion apparent.

Much less corrosion was evident for coupons which had been previously immersed 30 seconds in treatment solutions of the Example 2 product, neutralized with nitric acid to pH=4.35, at 1 g/L or at 5 g/L, and subsequently rinsed in hot water and air dried than was apparent for an untreated control.

EXAMPLE 4

Phosphoric Acid Neutralization

When 0.2 Molar (2% by weight) orthophosphoric acid solution was titrated into a 5% NV suspension of the Example 2 product, it dissolved at pH=3.9 and required about 1.2 moles H3p04 per mole nitrogen. Spot tests on galvanized steel treated with this solution diluted to about 4 g/L indicated that some passivation was provided: better than untreated galvanized but not as good as the chrome-treated galvanized control.

EXAMPLE 5

Humidity Testing

Humidity testing (ASTM - 2247) was conducted in which treated panels of galvanized metal were exposed to 99% relative humidity at 100° F. for 264 hours (11 days). Table 2 compares the results obtained by a treatment solution of the Example 2 product diluted to 3 g/L, as an unneutralized fine suspension and as neutralized. The treatment conditions were 10 second immersion at 140° F. The average of four separate deionized water treatments is also shown for comparison. Ratings indicate percentage of surface covered by white corrosion product, the lowest rating being best. Unneutralized Quebracho-DEA Mannich adduct at pH near 8 is also very effective on zinc.

TABLE 2

| Humidity Results | |
| --- | --- |
| Example 1 unneutralized | 1% |
| Example 1 neutralized with HF to pH = 4.35 | 10% |
| Example 1 neutralized with HNO$_3$ to pH = 4.55 | 20% |
| Deionized Water Control, average of 4 | 65% |

EXAMPLE 6

3/2 DEA Adduct

The reaction of Example 1 was carried out except that 1.5 moles of diethanolamine and 1.5 moles of formaldehyde were used per 300 grams (theoretically one equivalent) of Quebracho tannin; the suspension was somewhat more dilute, only 17.7% wt/vol. The reaction occurred at ambient temperature.

Chemical analysis for free formaldehyde after 3½ hours of reaction time showed that 41% of the original formaldehyde had not yet reacted; after 32 days at ambient temperature, 33% of the formaldehyde had still not yet reacted. The product was easily solubilized in common acids.

EXAMPLE 7

Methyl Amine Adduct

This example illustrates the use of a primary amine, methyl amine, also called monomethyl amine, CH$_3$NH$_2$. The components listed in Table 3 were combined in a 4L beaker magnetically stirred and thermostatically controlled at 50° C.

TABLE 3

| Component | Methyl Amine Adduct | | | |
|---|---|---|---|---|
| | F.W. | Eqv. | Grams | g.N.V. |
| 40% aqueous Methyl Amine | 31.1 | 1.0 | 77.7 | 31 |
| Quebracho Tannin | 300* | 1.0* | 300. | 300 |
| Deionized Water | — | — | 2,542 | — |
| 37% Formaldehyde | 30.0 | 1.0 | 80.3 | 30 |
| Total | | | 3,000 | 361 |

*estimated

The formaldehyde solution was quickly dripped into the solution of Quebracho in amine. Analysis for free formaldehyde after 10 minutes, 45 minutes, 3 hours and 5 hours showed that the formaldehyde remaining unreacted decreased from 22%, 17%, 8% to 1% respectively. The slurry had a concentration of 12% by weight and was soluble in acids.

EXAMPLE 8

⅔ DEA Adduct

Using the same procedure as for Example 7 except at ambient temperature, the components listed in Table 4 were reacted. Two moles of amine and two moles of formaldehyde were used per three moles Quebracho.

TABLE 4

| Component | ⅔ DEA Adduct | | |
|---|---|---|---|
| | E.W. | Eqv. | Grams |
| Diethanolamine | 105 | 0.89 | 93 |
| Quebracho | 300* | 1.33* | 400 |
| Deionized Water | — | — | 3,200 |
| 37% Formaldehyde | 30 | 0.89 | 72 |
| | | | 3,765 |

*estimated

The concentration of the suspension was 15% by weight; 8.7 pH. Free formaldehyde analysis showed 27% and below 5% of the original charge was still unreacted after 3 hours and 25 hours at ambient temperature respectively. It will be appreciated by those skilled in the art that for commercial manufacture, it is not necessary to complete the Mannich reaction in a reaction vessel; the incompletely reacted product will go to completion during storage or shipment within a few days.

EXAMPLE 9

⅔ Diethanolamine - Quebracho

The procedure of Example 7 was followed except that the temperature was controlled at 50° C. instead of ambient. The slurry had a 13.8 wt % concentration. The percents of free formaldehyde remaining after 5 min., 30 min., 2.25 hours, 3.25 hours and 4.25 hours at 50° C. were respectively 45%, 33%, 28%, 18% and 15%. As one would have expected, increased reaction temperature increased the rate of reaction but considerable formaldehyde remained unreacted.

EXAMPLE 10

Methyl Ethanol Amine Adduct

This example illustrates the use of another secondary amine, methylethanolamine, also called 2-methylaminoethanol, $CH_3NHC_2H_5OH$, F.W.=75.1. The procedure was exactly the same as Example 9, also at ambient temperature, using ratios of one mole amine and one mole formaldehyde per 300 grams Quebracho tannin. The weights of components were: 3,150 g. water, 100 g. 2-methylaminoethanol; 400 g. Quebracho; and 81g. 37% formaldehyde solution. The slurry had a concentration of 14.4 wt % and a 9.85 pH.

EXAMPLE 11

Accelerated Aging and Solubility

Table 5 summarizes results of an accelerated test wherein adducts were stored in glass bottles at 120° F. after acidification with 2.0 M orthophosphoric, nitric and hydrofluoric acids. Initially, all compositions tabulated were low viscosity solutions with no precipitate after centrifugation. The abbreviations "OK", "gel" and "pct" mean respectively: no change from a clear low viscosity liquid; gellation into a viscous or semi-solid but homogeneous material; precipitation into two phases.

The extent of neutralization was calculated as moles of acid per mole of amine for measured amounts of material. Solubilization required about 100% for a moderately strong acid like phosphoric, somewhat less for a strong acid like nitric, and somewhat more for a weak acid like hydrofluoric. The Example 7 adduct neutralized with nitric acid to only 88% was starting to gel after 11 days aging and had gelled after 28 days whereas the 100% neutralized version was still a clear solution, OK. In general, best aging was obtained with at least 100% neutralization for the strong and moderate strength acids and considerably more for a weak acid. Hydrofluoric acid neutralized adducts are best stored in plastic (polyethylene) containers instead of glass. The adduct with ratios of 1.5 or 0.67 moles of amine per 300 grams of Quebracho were not as stable as those with 1.0 mole amine.

TABLE 5

| | Stability of Neutralized Adducts After 120° F. Aging | | | | | | |
|---|---|---|---|---|---|---|---|
| Product of Example No. | 6 | 7 | | 8 | | 10 | |
| Amine used | Diethanol | Methyl | | Diethanol | | Methyl Ethanol | |
| Moles amine per 300 g. Quebracho | 1.5 | 1.0 | | 0.67 | | 1.0 | |
| Phosohoric Acid | | | | | | | |
| % Neutralization | 100% | 100% | 115% | 90% | 115% | 98% | |
| pH | 3.3 | 3.2 | 2.7 | 3.7 | 2.9 | 3.8 | |
| After 11 days | gel | OK | OK | gel | gel | OK | |
| After 28 days | — | OK | OK | — | — | OK | |
| Nitric Acid | | | | | | | |
| % Neutralization | 95% | 88% | 100% | 81% | 106% | 100% | 118% |
| pH | 3.9 | 4.0 | 3.0 | 3.7 | 2.5 | 2.7 | 1.6 |
| After 11 days | pct. | ½ gel | OK | gel | ½ gel | OK | OK |
| After 28 days | — | gel | OK | — | gel | OK | OK |

TABLE 5-continued

| Product of Example No. | Stability of Neutralized Adducts After 120° F. Aging | | | | |
|---|---|---|---|---|---|
| | 6 | 7 | 8 | | 10 |
| Hydrofluoric Acid | | | | | |
| % Neutralization | 100% | 115% | 200% | 470% | 115% |
| pH | 5.1 | 4.6 | 4.1 | 3.5 | 4.7 |
| In plastic after 11 days | gel | OK | OK | OK | OK |
| In plastic after 28 days | — | gel | OK | gel | OK |
| In glass after 11 days | — | — | — | OK | gel |

EXAMPLE 12
Wattles Adduct

Wattles tannin was dissolved in 2-methylaminoethanol and DI-water, and 37% formaldehyde was slowly dripped in over about two hours at about 29° C. Reaction was evident from the change in appearance and color from a red-brown solution to a purplish-brown suspension. The product was soluble in acids such as $H_3PO_4$, $HNO_3$, HCl, HF and the like.

What is claimed is:

1. An aqueous metal treatment solution comprising from about 0.01 g/liter to about 50 g/liter of the condensation reaction product of a vegetable tannin, an aldehyde and an amine.

2. The aqueous solution of claim 1 wherein said vegetable tannin is Quebracho, said aldehyde is formaldehyde and said amine is selected from the group consisting of primary and secondary amines.

3. The aqueous solution of claim 1 wherein said treatment solution has a pH of from about 0.5 to about 13.

4. The aqueous solution of claim 1 wherein said vegetable tannin is selected from the group consisting of Quebracho, Wattles, mangrove, spruce, hemlock, gabien, catechu, uranday, tea, hydrolyzable tannins, larch vegetable tannins, and mixtures thereof.

5. The aqueous solution of claim 1 wherein said amine is selected from the group consisting of diethanolamine, methylethylamine, dimethylamine, diethylamine, dipropylamine, di-n-butylamine, diisoamylamine, dibenzylamine, methyldiethylethylenediamine, methylaniline, piperidine, 1,2,3,4,-tetrahydroisoquinoline, 6-methoxy-1,2,3,4,-tetrahydroisoquinoline, morpholine, piperazine, ω-methylaminopropiophenone, β-acetylethylbenzylamine; benzyl-(2-cyclohexanonylmethyl)-amine, 3,4-methylenedioxybenzyl-(2-cyclohexanonylmethyl)-amine, N-methylglucamine, glucosamine, and t-butylamine.

6. The aqueous solution of claim 2 wherein said formaldehyde and amine are employed in said reaction in a molecular equivalence ratio, with respect to 1.0 molecular equivalent of polyphenol in said vegetable tannin, of from about 1.0 to about 2.0 moles of formaldehyde per mole of polyphenol in said vegetable tannin, and from about 1.0 to about 1.1 moles of amine per mole of polyphenol in said vegetable tannin, respectively.

7. The aqueous solution of claim 5 wherein said vegetable tannin is Quebracho and said aldehyde is formaldehyde.

8. A process for treating a metal surface comprising the steps of contacting a metal surface with an aqueous solution comprising from about 0.1 g/liter to about 50 g/liter of the condensation reaction product of a vegetable tannin, an aldehyde, and an amine.

9. The process of claim 8 wherein said vegetable tannin is Quebracho and said amine is selected from the group consisting of primary and secondary amines.

10. The process of claim 8 wherein said solution has a pH of from about 0.5 to about 13.

11. The process of claim 8 wherein said vegetable tannin is selected from the group consisting of Quebracho, Wattles, mangrove, spruce, hemlock, gabien, catechu, uranday, tea, hydrolyzable tannins, larch vegetable tannins and mixtures thereof.

12. The process of claim 8 wherein said amine is selected from the group consisting of diethanolamine, methylethylamine, dimethylamine, diethylamine, dipropylamine, di-n-butylamine, diisoamylamine, dibenzylamine, methyldiethylethylenediamine, methylaniline, piperidine, 1,2,3,4,-tetrahydroisoquinoline, 6-methoxy-1,2,3,4,-tetrahydroisoquinoline, morpholine, piperazine, -methylaminopropiophenone, -acetylethylbenzylamine; benzyl-(2-cyclohexanonylmethyl)-amine, 3-4-methylenedioxybenzyl(2-cyclohexanonylmethyl)-amine, N-methylglucamine, glucosamine, and t-butylamine.

13. The process of claim 8 wherein said formaldehyde and amine are employed in said reaction in a ratio of molecular equivalence with respect to 1.0 molecular equivalent of polyphenol in said vegetable tannin of from about 1.0 to about 2.0 moles of formaldehyde per mole of polyphenol and from about 1.0 to about 1.1 moles of amine per mole of polyphenol, respectively.

14. The process of claim 12 wherein said vegetable tannin is Quebracho and said aldehyde is formaldehyde.

15. The process of claim 8 wherein said metal is aluminum.

16. The process of claim 8 wherein said metal is steel.

17. The process of claim 8 wherein said metal is galvanized steel.

18. The process of claim 8 wherein said metal comprises zinc.

19. The process of claim 8 wherein said metal surface is a conversion coated surface.

20. The process of claim 19 wherein said metal surface is a zinc phosphate conversion coated surface.

21. The process of claim 8 wherein said aqueous solution comprises a metal ion selected from the group consisting of titanium, zirconium, hafnium and mixtures thereof.

* * * * *